United States Patent Office 2,776,978
Patented Jan. 8, 1957

2,776,978

2,4-DIAMINOTHIAZOLES CONTAINING A HALOGENATED ARYL RADICAL IN THE 5-POSITION AND DERIVATIVES

Raymond M. Dodson, Park Ridge, Ill., assignor to G. D. Searle & Co., Chicago, Ill., a corporation of Delaware No Drawing. Application May 19, 1955,
Serial No. 509,689

9 Claims. (Cl. 260—306.8)

This invention relates to a new group of thiazole derivatives and, more particularly, to 2,4-diaminothiazoles containing a halogenated aryl radical in the 5-position and derivatives thereof. The compounds which constitute the invention are the bases of the general structural formula

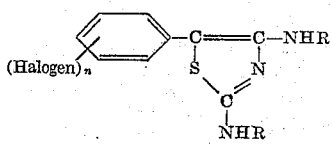

and the non-toxic salts thereof, where $n$ is a positive integer preferably smaller than 3 and R is a member of the class consisting of hydrogen and acyl radicals derived from hydrocarbon carboxylic acids containing preferably less than 9 carbon atoms.

In the foregoing structural formula the halogen atoms can be fluorine, chlorine, bromine, and iodine atoms. The radical R can be an acyl radical such as a formyl, acetyl, propionyl, butyryl, pentaoyl, hexanoyl, benzoyl, toluyl, phenacetyl, cyclohexancetyl, cyclopentanepropionyl, and the like. The 2,4-diamines of the foregoing type forms salts with a variety of inorganic and strong organic acids including sulfuric, phosphoric, hydrochloric, hydrobromic, hydriodic, sulfamic, citric, lactic, maleic, malic, succinic, tartaric, cinnamic, acetic, benzoic, gluconic, and ascorbic acid, 8-chlorotheophylline, 8-bromotheophylline, 8-chlorotheobromine, and the like.

The compounds which constitute this invention are valuable pharmaceutical agents, particularly as analgesics and analeptics. They are also valuable intermediates in organic synthesis, particularly for the purpose of formation of 2-amino-5-haloaryl-4(5)-thiazolones and 5-haloarylthiazolidine-2,4-diones which are valuable pharmacodynamic agents, especially as differential growth inhibitors, which, e. g., have a cortisone-like action in preventing growth of connective tissue around foci of irritation.

Treatment of the compounds of this invention with three equivalents of acyl halides or anhydrides in pyridine yields the 2,4-diacylimino-3-acyl-5-(haloaryl)-thiazolidines which are useful as analeptic agents.

The compounds of this invention are conveniently prepared by treatment of a nitrile of the formula

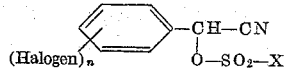

X being a lower hydrocarbon radical and $n$ being defined as hereinabove, with a substantial equivalent of thiourea or a diacylthiourea of the type

R being defined as hereinabove.

The examples below are given to illustrate in further detail certain of the compounds which constitute the invention and convenient methods for their preparation. However, the details set forth are in no way to be construed as limiting the invention in spirit or in scope. It will be apparent to chemists skilled in the art of organic synthesis that many modifications in materials and methods can be used without departing from the invention. In these examples temperatures are given in degrees centigrade (° C.) and quantities of materials in parts by weight.

Example 1

To a stirred mixture of 124 parts of p-fluorobenzaldehyde and 176 parts of benzenesulfonyl chloride maintained in an ice bath at 0–5° C. there is added a solution of 49 parts of sodium cyanide in 200 parts of water. Stirring and chilling are continued for 3.5 hours after which the reaction mixture is diluted with 400 parts of acetone. Then 76 parts of thiourea are added, whereupon the reaction mixture becomes slightly warm and turns dark purple. After shaking for about 5 minutes a precipitate begins to form. Shaking is continued for about 10 minutes after which the mixture is diluted with 100 parts of water. A precipitate forms which is collected on a filter, dissolved in methanol, stirred with charcoal and filtered. Upon addition of ether to the filtrate, there precipitates the benzenesulfonate of 2,4-diamino-5-(p-fluorophenyl) thiazole which melts with decomposition at about 273–275° C. Treatment of a dilute aqueous solution of this salt with concentrated ammonium hydroxide causes the formation of a fine white precipitate. The free base thus obtained melts at about 153–155° C. with decomposition.

Addition to a methanol solution of the basic 2,4-diamino-5-(p-fluorophenyl) thiazole of one equivalent of a 25% solution of hydrogen chloride in isopropanol followed by addition of ether causes precipitation of a crystalline hydrochloride. This salt does not show a definite melting point but gradually turns black above 250° C. The base has the structural formula

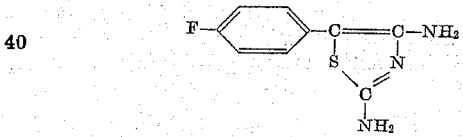

Example 2

Under ice cooling and stirring a mixture of 70.3 parts of o-chlorobenzaldehyde and 88 parts of benzenesulfonyl chloride is treated with 24.5 parts of sodium cyanide in 100 parts of water. Stirring at 0–5° C. is continued for 3 hours whereupon the oily layer is separated and dissolved in a mixture containing 100 parts of acetone, 100 parts of ethanol, and 50 parts of ether. A small amount of insoluble material is removed by filtration and the filtrate is treated with 150 parts of ice whereupon an oil separates. This oil is dried by filtering through a bed of anhydrous sodium sulfate.

153.9 parts of the 2-chloro-α-cyanobenzyl benzenesulfonate thus obtained are treated with 170 parts of acetone and 38.1 parts of thiourea and permitted to stand at room temperature for 12 hours. Then 500 parts of water are added and after storage at 0° C. for several hours the precipitate is collected on a filter and air dried. After recrystallization from ethanol and ether, the benzenesulfonate of 2,4-diamino-5-(o-chlorophenyl)-thiazole melts at about 235–236° C. with decomposition.

A mixture of 5 parts of this benzenesulfonate, 12 parts of concentrated hydrochloric acid and 1 part of ether are mixed for 5 minutes and then stirred for 90 minutes with 40 parts of acetone. The precipitated hydrochloride is collected on a filter and washed with acetone and then with ether to yield the hydrochloride melting at about 255–256° C. with decomposition. This salt has the structural formula

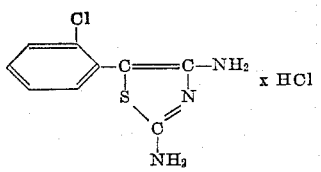

Example 3

Under a nitrogen atmosphere 5 parts of the benzenesulfonate of 2,4-diamino-5-(o-chlorophenyl)-thiazole in 100 parts of water are stirred with 10 parts of concentrated ammonium hydroxide for 15 minutes. The oily free base is separated, washed with water, and then dissolved in 21 parts of acetic anhydride. After standing at room temperature for 2.5 hours the solution is diluted with ice and water and on standing a precipitate forms which is collected on a filter and dissolved in methanol. Water is added to the point of incipient crystallization. 2,4 - diacetylamino - 5 - (o-chlorophenyl)-thiazole is thus obtained in crystals melting at about 207–208° C. The compound has the structural formula

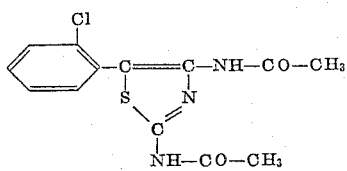

Example 4

A mixture of 5 parts of 2,4-diamino-5-(o-chlorophenyl) thiazole benzenesulfonate, 21 parts of pyridine and 21 parts of acetic anhydride is maintained at room temperature for a day and then diluted with ice and water. The oily precipitate is separated, washed with water and dissolved in methanol. To the methanolic solution a small amount of water is added until crystallization takes place. On recrystallization from ethanol there is obtained 2,4-diacetylimino-3-acetyl-5-(o-chlorophenyl)-thiazolidine melting at about 170–171° C.

Example 5

A mixture of 1406 parts of m-chlorobenzaldehyde, 1766 parts of benzenesulfonyl chloride, 490 parts of sodium cyanide, and 2000 parts of water is allowed to stand at 0–5° C. with occasional shaking for 3 hours.

The reaction mixture is diluted with 4000 parts of acetone, after which 760 parts of thiourea are added. The mixture is shaken for 25 minutes and then diluted with 10,000 parts of water. Then 3600 parts of concentrated hydrochloric acid are added and the mixture is washed with ether. The clear aqueous solution is rendered alkaline by treatment with ammonium hydroxide and the resulting precipitate is collected on a filter, washed thoroughly with water, and dried in air.

753 parts of 2,4-diamino-5-(m-chlorophenyl)-thiazole thus obtained are dissolved in 1200 parts of methanol and the solution is rendered acidic by addition of a 20% solution of hydrogen chloride in isopropanol. The acidic suspension is warmed to effect solution, stirred with charcoal and filtered. Addition of anhydrous ether causes precipitation of the hydrochloride. The hydrochloride obtained on repeated crystallization from methanol on addition of ether melts at about 260–267° C. with decomposition.

Example 6

Under stirring and ice cooling a mixture of 70.3 parts of p-chlorobenzaldehyde and 88 parts of benzenesulfonyl chloride is treated with 24.5 parts of sodium cyanide in 100 parts of water. Stirring at 0–5° C. is continued for 3 hours after which the oily layer is separated and dissolved in a mixture containing 100 parts of acetone, 100 parts of ethanol, and 50 parts of ether. A small amount of insoluble material is removed by filtration and the filtrate is treated with 150 parts of ice whereupon an oily product forms which is dried over anhydrous sodium sulfate.

153.9 parts of the 4-chloro-α-cyanobenzyl benzenesulfonate thus obtained are treated with 180 parts of acetone and then with 38.1 parts of thiourea. When the mixture has stood for a day, water is added and the precipitate is collected on a filter and washed with ether. On crystallization from hot ethanol by addition of ether the benzenesulfonate of 2,4-diamino-5-(p-chlorophenyl)thiazole is obtained melting at about 264–266° C. with decomposition.

A mixture of 5 parts of this benzenesulfonate, 12 parts of concentrated hydrochloric acid and 40 parts of acetone is stirred at room temperature for 90 minutes. The precipitate is collected on a filter, washed with acetone and then with ether, and then recrystallized from ethanol by precipitating with ether to yield the hydrochloride of 2,4-diamino-5-(p-chlorophenyl)thiazole melting at about 261–263° C. with decomposition.

The free base is obtained by suspending 5 parts of the benzenesulfonate in 100 parts of water and adding 10 parts of concentrated ammonium hydroxide with stirring under a nitrogen atmosphere. The crude free base thus obtained melts at about 154–155° C. with decomposition.

Example 7

A solution of 1 part of 2,4-diamino-5-(p-chlorophenyl)-thiazole in 5 parts of butyric anhydride is permitted to stand at room temperature for 5 hours and then diluted with ice and water. On standing there precipitates in light yellow high melting crystals 2,4-dibutyrylamino-5-(p-chlorophenyl)thiazole which has the structural formula

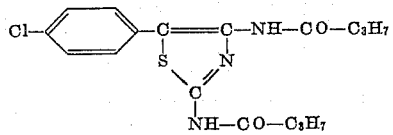

Example 8

A mixture of 5 parts of the benzenesulfonate of 2,4-diamino-5-(p-chlorophenyl)thiazole, 20 parts of pyridine and 20 parts of acetic anhydride is maintained at room temperature for a day and then diluted with ice and water. The oily precipitate is separated and crystallized from methanol. There is thus obtained 2,4-diacetylimino-3-acetyl - 5 - (p-chlorophenyl)thiazolidine melting at about 201–202° C.

Example 9

A mixture of 23.2 parts of p-iodobenzaldehyde, 17.6 parts of benzenesulfonyl chloride, 4.9 parts of sodium cyanide and 20 parts of water is stirred in an ice bath for 5 hours and then diluted with 40 parts of acetone. 7.6 parts of thiourea are added and the mixture is shaken for 30 minutes and diluted with water. Upon standing there precipitates the 2,4-diamino-4-(p-iodophenyl)thiazole benzenesulfonate, a compound which decomposes when heated above 250° C. This substance has the structural formula

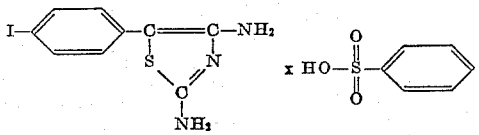

Example 10

A mixture of 525 parts of o,p-dichlorobenzaldehyde and 530 parts of benzenesulfonyl chloride is heated on a steam bath, then stirred and cooled to 0° C. It is then treated with a solution of 172 parts of sodium cyanide in 500 parts of water. Agitation is continued for 3 hours at 0–5° C. after which time the oily organic layer is separated and washed repeatedly with water. On chilling the o,p-dichloro-α-cyanobenzyl benzenesulfonate forms a hard glass.

A mixture of 342 parts of this product, 400 parts of acetone and 76 parts of thiourea is shaken at room temperature until solution is complete. Upon standing a precipitate is formed. The mixture is diluted with 2500 parts of water and permitted to stand at room temperature for 5 hours, after which the precipitate is collected on a filter. On recrystallization from ethanol and ether, the 2,4-diamino-5-(o,p-dichlorophenyl)thiazole benzenesulfonate thus obtained melts at about 257–259° C. with decomposition.

A mixture of 100 parts of this salt, 240 parts of concentrated hydrochloric acid and 1 part of ether is stirred for 10 minutes and then treated with 800 parts of acetone. Stirring is continued for 2 hours at room temperature after which the precipitate is collected on a filter, washed with ether containing a small amount of acetone and dried. On recrystallization from ethanol and ether the crystalline hydrochloride is obtained which melts with decomposition at about 270–280° C.

*Example 11*

A mixture of 25 parts of 2,4-diamino-5-(o,p-dichlorophenyl)thiazole benzenesulfonate, 500 parts of water, and 100 parts of concentrated ammonium hydroxide is stirred under nitrogen for 15 minutes and the resulting precipitate is collected on a filter and washed with water. It is then dissolved in 105 parts of acetic anhydride and allowed to stand at room temperature for 1 hour. Then it is diluted with water and the precipitate is collected on a filter. The resulting product is dissolved in methanol, heated and then diluted with water. The precipitate is collected on a filter, dried and crystallized from a mixture of acetone and cyclohexane to yield 2,4-diacetylamino-5-(o,p-dichlorophenyl)thiazole which melts at about 200.5–201.5° C. This compound has the structural formula

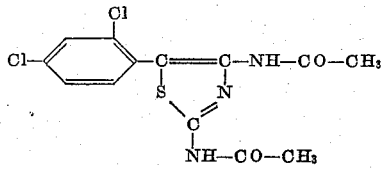

*Example 12*

A mixture of 25 parts of 2,4-diamino-5-(o,p-dichlorophenyl)thiazole benzenesulfonate, 100 parts of pyridine and 100 parts of acetic anhydride is maintained at room temperature for 12 hours and then diluted with ice and water. The precipitate is separated and washed with water. On crystallization from dilute methanol, there is obtained the 2,4-diacetylimino-3-acetyl-5-(o,p-dichlorophenyl)thiazolidine melting at about 217–220° C.

*Example 13*

To an ice-cooled mixture of 17.5 parts of m,p-dichlorobenzaldehyde and 17.6 parts of benzenesulfonyl chloride is added a solution of 4.9 parts of sodium cyanide in 20 parts of water. After being stirred in an ice bath for 3 hours, the mixture is dilute with 40 parts of acetone and then treated with 76 parts of thiourea. The resulting mixture is shaken thoroughly for 15 minutes and then permitted to stand at room temperature for an additional 15 minutes and diluted with water. The mixture is acidified with 36 parts of concentrated hydrochloric acid and extracted with benzene. The lower oily layer and the middle aqueous layer is separated from the upper benzene layer. The lower oily layer and the aqueous layer are treated with ammonium hydroxide. The 2,4-diamino-5-(m,p-dichlorophenyl)thiazole is thus obtained as a brown precipitate which is collected on a filter and washed thoroughly with water. It has the structural formula

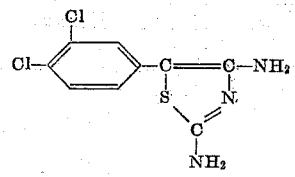

Treatment of a methanol solution of this base with hydrogen chloride is isopropanol using charcoal decolorization and precipitation of the product with ether yields the white crystalline hydrochloride which decomposes at about 260–270° C.

*Example 14*

A mixture of 367 parts of 2,4-diamino-5-(p-fluorophenyl)thiazole benzenesulfonate, 2200 parts of pyridine and 281 parts of benzoyl chloride is stirred at room temperature for 2 hours and then poured into an aqueous sodium acetate solution. A precipitate forms which is collected on a filter, washed with water and recrystallized from dilute methanol to yield 2,4-dibenzoylamino-5-(p-fluorophenyl)thiazole in prismatic light yellow crystals. The compound has the structural formula

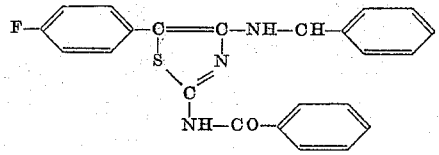

*Example 15*

A mixture of 3.67 parts of 2,4-diamino-5-(p-fluorophenyl)thiazole benzenesulfonate, 20 parts of pyridine and 3.25 parts of β-cyclopentylpropionyl chloride is stirred at room temperature for 3 hours and then poured into an aqueous sodium acetate solution. The precipitate is separated, washed with water and recrystallized from dilute ethanol to yield 2,4-bis(β-cyclopentylpropionylamino)-5-(p-fluorophenyl)thiazole in fine light amber needles. The compound has the structural formula

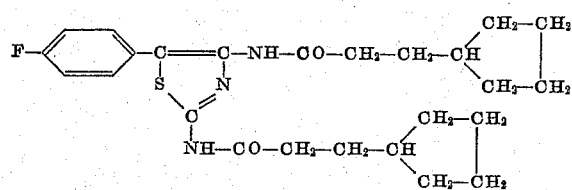

*Example 16*

A suspension of 5.9 parts of 2,4-diamino-5-(o-chlorophenyl)thiazole in 150 parts of dilute (1:2) hydrochloric acid is heated at reflux for 10 minutes and then quickly added to 50 parts of ice. The resulting cool solution is filtered and the filtrate is neutralized with concentrated ammonium hydroxide. The white precipitate is collected on a filter and crystallized from methanol to yield 2-amino-5-(o-chlorophenyl)-4(5)-thiazolone melting at about 251–252° C. with decomposition.

*Example 17*

A stirred suspension of 59 parts of 2,4-diamino-5-(o-chlorophenyl)thiazole in 1500 parts of dilute (1:2) hydrochloric acid is heated at reflux for 10 minutes and then quickly poured on 500 parts of ice with external cooling. A sticky precipitate is formed melting at about 224–228° C. with decomposition. 3 parts of this precipitate are refluxed for 2 hours with 150 parts of dilute (1:2) hydrochloric acid after which ice is added. On chilling the initially formed oil solidifies. The precipitate is collected on a filter, washed with water and taken up in a minimal amount of methanol. Upon addition of water there crystallizes 5-(o-chlorophenyl)thiazolidine-2,4-dione melting at about 127–128° C.

What is claimed is:

1. A compound of the structural formula

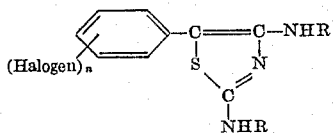

wherein $n$ is a positive integer smaller than 3 and R is a member of the class consisting of hydrogen and acyl radicals derived from hydrocarbon carboxylic acids containing less than 9 carbon atoms.

2. A compound of the structural formula

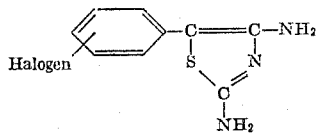

3. 2,4-diamino-5-(chlorophenyl)thiazole.
4. A compound of the structural formula

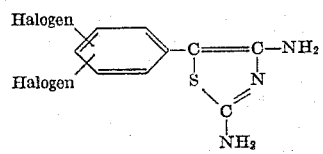

5. 2,4-diamino-5-(dichlorophenyl)thiazole.
6. A compound of the structural formula

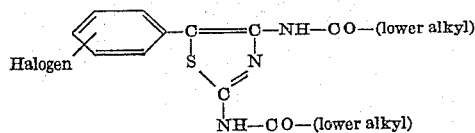

7. 2,4-diacetylamino-5-(chlorophenyl)thiazole.
8. A compound of the structural formula

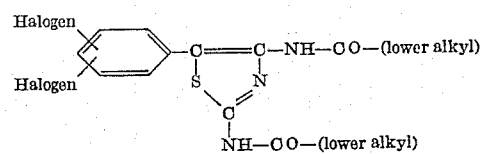

9. 2,4-diacetylamino-5-(dichlorophenyl)thiazole.

References Cited in the file of this patent

UNITED STATES PATENTS 2,709,172    Dodson ---------------- May 24, 1955

OTHER REFERENCES

Ohta: Chem. Abst., vol. 46, col. 4002 (1952).